Jan. 10, 1967     H. H. DAUGHTERS     3,296,689
METHOD FOR IDENTIFYING SELECTIVE SECTIONS
OF A METALLIC MATERIAL
Filed Feb. 1, 1965
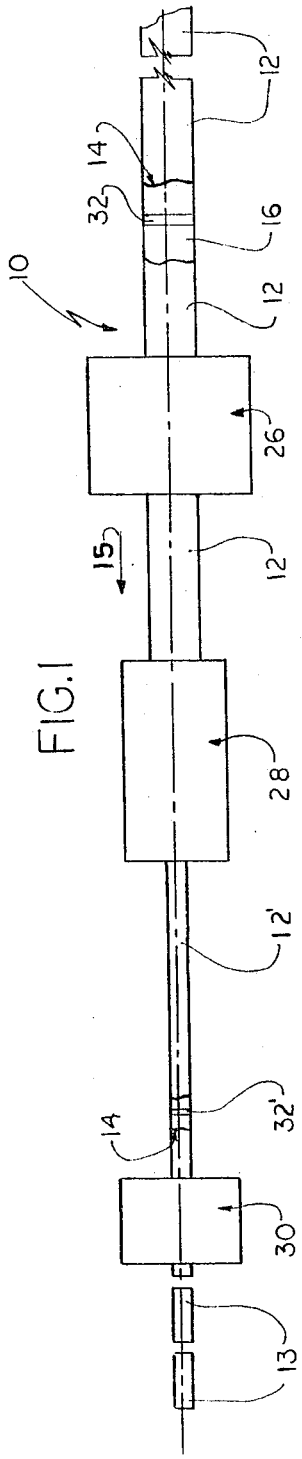
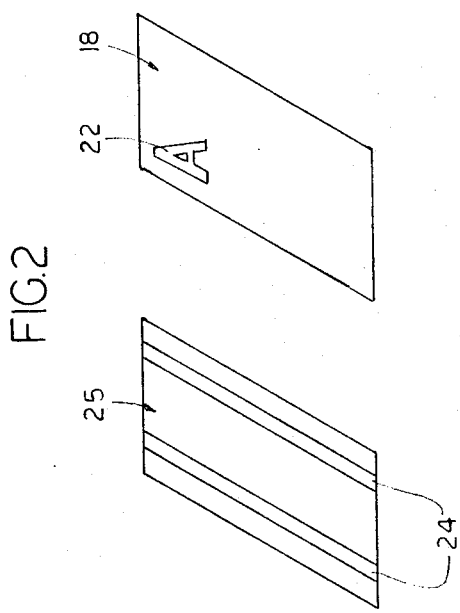
INVENTOR.
HAROLD H. DAUGHTERS
BY *James E. Rooney*

United States Patent Office 3,296,689
Patented Jan. 10, 1967

3,296,689
METHOD FOR IDENTIFYING SELECTIVE SECTIONS OF A METALLIC MATERIAL
Harold H. Daughters, Upland, Calif., assignor to Kaiser Steel Corporation, Oakland, Calif., a corporation of Nevada
Filed Feb. 1, 1965, Ser. No. 429,262
5 Claims. (Cl. 29—407)

The above invention relates to a method for readily identifying and maintaining the identity of selective portions of a metallic material during at least one manufacturing step involved in the fabrication of a preselected article from the metallic material.

More particularly, this invention relates to an improved method for identifying and maintaining the identity of selected portions of a metallic material being fabricated into a predetermined article of manufacture by applying to said selected portions of the metallic material, such as a strip of steel, a coating of a dissimilar but reflective material such as aluminum whereby the identity of the coated surface areas of the steel strip even when heat treated will be readily maintained by virtue of the detachable differences between the coated and uncoated surface areas of the strip.

Accordingly, the primary purpose of the instant invention is to provide an improved method of identifying and maintaining the identity of selected portions of a metallic strip such as a steel strip.

These and other purposes and advantages of the instant invention will become more apparent from a review of the following detailed description when taken in conjunction with the appended drawings, wherein:

FIGURE 1 is a diagrammatic plan view of several fabricating or processing steps for a steel strip and illustrates the application of an identifying coating of a dissimilar but reflective material such as aluminum to selected surface areas of said strip; and FIGURE 2 is a plan view of random sections of the strip of FIGURE 1 and illustrates the application of coatings of a dissimilar but reflective material applied in different patterns to materials treated in accordance with the instant invention.

In the manufacture of continuously formed butt-welded steel pipe 12' it is customary to flash weld together the adjacent ends of unwound coil lengths of strip material by an appropriate apparatus, not shown, to thereby make up a continuous endless length of strip skelp material 12 which is then fabricated into butt welded formed pipe 12'. These flash welded ends generally indicated at 32 in FIG. 1 constitute weakened and objectionable parts in the finally formed pipe. Removal of the welded end section 32 is therefore desirable prior to final sale of the pipe. A problem has existed in the past, however, of being able to identify and detect these objectionable parts without the use of complex and expensive flaw detecting equipment. Therefore, one of the principal advantages of the instant invention, as set forth hereinafter, is to provide a unique simple solution to this problem.

With further reference to the drawings and in particular FIG. 1, a preferred form of apparatus that can be used in carrying out the teachings of the instant invention generally comprises a processing or production line 10 made up of a series of spaced conventional processing stations generally indicated at 26, 28 and 30 for the continuous passage therethrough of an endless strip of material 12 such as a steel strip in the direction indicated by the arrow 15, that is being formed into butt-welded steel pipe in a conventional manner. This strip of material 12 can be continuously fed through the production line by suitable means such as an underlying conveyor, not shown. For a purpose to be described more fully hereinafter, a relatively thin coating 16 of a dissimilar but reflective material, such as aluminum, is advantageously applied in a suitable manner to predetermined or selected areas 14 on the continuously fed strip 12 by any suitable means prior to the time the steel strip is subjected to the usual heat treatment.

In FIG. 2, typical random panel sections 18 and 25 of the steel strip being processed are shown. Panel section 18 has a coating of dissimilar but reflective aluminum paint applied to a surface area 22 thereof in the form of the letter "A" when the section is in a relatively cold state or condition and prior to its being subjected to heat treatment. Similarly, the other panel section 25 has a coating of aluminum paint applied to the surface area 24 thereof in the form of a pair of parallel stripes. As will become more apparent hereinafter the coated surface areas 14, 22 or 24 of FIG. 1 or 2 can readily be detected and identified after the heat treatment of the endless strip 12 or the panel sections 18 or 20 by virtue of the difference in color or detectable difference in temperature that occurs as a result of the different temperature levels reached by the coated and uncoated areas of the panels.

The production line 10 of FIG. 1 is illustrative of one arrangement for manufacturing butt-welded steel pipe wherein the endless strip of skelp material 12 is continuously fed in a customary manner through successive processing stations in the production line, namely: a heating station 26, a forming station 28, and a shear station 30 where the formed pipe is cut into the desired sectional lengths 13. In this processing, the strip is heated at the heating station 26 to the desired temperature level for subsequent butt-weld forming. Station 26 can comprise a suitable gas fired furnace for heating of the strip 12 by radiation. Then the heated strip is next passed through a forming station 28 where a conventional roll forming device progressively bends and draws the ends of the heated strip 12 together to form a butt-welded endless pipe generally indicated at 12'. The formed pipe 12' is then cut into desired commercial lengths 13 at the shearing station 30.

It has been found that the aforesaid problem of strip identification can be simply and expediently solved by the application of a coating of dissimilar but reflective material 16 such as aluminum paint to the surface area 14 which includes the welded ends 32 prior to the introduction of these areas through the heating zone or station 26. This coating enables the welded ends 32 to be readily identified and detected at 32' as part of the formed pipe 12' by virtue of the difference in color or detectable difference in temperature of the coated and uncoated parts of the strip 12 due to the temperature levels reached by the coated surface and uncoated surface areas of the formed pipe 13.

The coating material 16 should have the characteristic of heat reflection in order to perform its identifying function. The coating 16 can be applied in any suitable manner to sufficiently cover the surface area 14 of the joined ends of the strip such as by a brush, roller, wiper, spray gun or a metallizing gun. A suitable material for a heat reflective coating is one of light color but of substantially different composition than the material to which it is applied. Such suitable coating materials can be a paint having a metallic or a metal oxide base, such as aluminum, magnesium or lead oxide. Other suitable coating materials could be of a ceramic or refractory nature both of which have the desirable characteristics of reflectivity while being dissimilar to material such as steel to which they are applied. The coating of a selected but dissimilar material to be applied to appropriate parts of the material being processed through a heating station would depend of course upon the temperature to be reached by the processed material. To assure effective detection by the method of the applied coating in the instant invention, a consideration also in selecting a dissimilar coating to be applied may be its compatibility to other processes to which the material is subjected to, other than heating, prior to the actual detection of the coated areas relative to the non-coated areas. For example a coating 16 of aluminum paint can be applied to the exposed surface of the strip in FIG. 1 prior to its entry into the heating station 26. Although it is known that the aluminum has a melting point below the temperature to which the steel strip 12 may be heated, normally above 2,000° F. to form butt-welded pipe 12', it has been found that even though the aluminum coating 16 is partially or wholly burned away at the heating station 26, it still has sufficient reflective characteristics to reflect the radiant heat energy away from the coated area 14 during the initial part of the heating cycle within the heating station 26 so that the coloring and temperature of the coated area 14 and the uncoated areas will be different and readily detectable. The reflection caused by the coating 16 results in a temperature difference of 20° F. to 150° F. or more between the coated surface area 14 and the non-coated surface areas of the strip 12 at the exit of the strip 12 from the heating station 26. Such a temperature difference results in a readily detectable difference in color between the coated area 14 at 32' relative to the non-coated areas of the formed pipe 12'. For instance, it has been found in the manufacture of butt-welded steel pipe 12' that the area 14 of the applied coating 16 will glow with a dull red color while the non-coated areas 12' would glow with a brighter red color between the stations 28 and 30 in FIG. 1.

A similar disparity in external coloring and temperature between the coated and uncoated parts of the strips also occurs after a heat treatment on the outside surface of the finally formed pipe; regardless of whether the coating 16 is initially applied to the top or bottom surface areas of the strip 12 prior to its being formed. It has been further found that even if the coating 16 is burned away at the heating station 26, the subsequent forming operations at the station 28 do not interfere for all practical purposes with the detection of the objectionable welded ends 32' of the formed pipe 12'. To actually detect the coated area 14 of the formed pipe 12' any means can be used, such as visual observation or even a suitable pyrometer.

In FIG. 2, coatings of dissimilar but reflective materials are applied to cover surface areas 22 and 24 of panel sections 18 and 25 that represent an intelligible code such as the letter "A" and the two parallel stripes of the panel sections 18 and 25. For instance, it may be desired to continuously feed a series of separate panel sections made up of panel sections 18 and 25, which differ, for example, only as to their content of alloying elements, through a heating station such as 26 in FIG. 1 but where the panel sections 18 and 25 have different predetermined time exposures within the heating station 26 to obtain the desired metallurgical characteristics, such as temper, for the intended use of these panel sections 18 and 25. Because the panel sections are of the same general geometrical shape, the operator would have no practical way of distinguishing between these panel sections within the heating station 26. Accordingly, the applied coatings of dissimilar but reflective material to cover the surface areas 22 and 24 in the manner shown advantageously enable the operator to discriminate in a simple fashion between the panel sections 18 and 25 within the heating station for their removal at the proper time.

Although FIGS. 1 and 2 represent illustrative teachings of the instant invention, it is to be understood that the applied coating of a dissimilar but reflective material can be used to cover any surface area of a material that cannot be readily detected after the material is subjected to at least one heat treatment. If the material is subjected to a series of heat treatments, it is obvious that the coating can be easily reapplied to the same coated surface areas or other surface areas after each heat treatment to thereby maintain positive detection of the coated surface areas. Further, in the event that the reflective coating applied does not provide sufficient difference in temperature level between the coated and non-coated surface areas of the heated material, the coating can be applied in greater thickness over the coated surface area and/or in larger or longer areas until proper reflectivity is obtained in the heating station to thereby readily detect the difference in the temperature level of the coated surface areas relative to the non-coated surface areas of the material.

As an illustrative example of the advantageous use of the applied coating on the steel strip 12, an SAE No. 1015 grade of strip steel was employed consisting of the following essential elements: 0.12% carbon, 0.40% manganese, 0.01% phosphorous, 0.02% sulphur, remainder iron. This analysis was within the range specified for SAE No. 1015 in the Metals Handbook by the American Society for Metals, eighth edition, volume 1. In addition, the 1015 steel is "mechanically capped" which refers to special handling of the steel during the manufacture thereof from raw materials whereby, when the steel is cast into an ingot mold in its molten state, the mold is suitably capped to confine the gases within the ingot mold during cooling of the cast steel therein so as to obtain a resultant steel ingot of desired, uniform metallurgical characteristics throughout prior to the steel ingot being reduced in a suitable manner to the steel strip 12 of FIG. 1. In the illustrative example, a 1015 steel strip 12, 0.105" thick and 5½" wide, formed ¾" steel pipe 12' in the process aforedescribed in FIG. 1.

As to the coating for the 1015 steel strip, an aluminum base paint was employed having a viscosity of 60–65 Kreb units and consisting essentially of 20% metallic aluminum flakes that were carried in a heat resistive varnish vehicle, which was temperature resistant up to 700° F. and made up of indeene-coumarone resin. The coating having a thickness in the order of 0.0005" to 0.004" was applied by a brush in a suitable manner to the aforementioned 1015 steel strip 12 corresponding to the coated surface area 14 at the welded end 32 in FIG. 1, whereby the following results occur:

(1) When the coating material was applied to the strip 12 so that it was the outer surface of the formed pipe 12', the non-coated areas of the formed pipe 12' had an average temperature of 2310° F. while the coated areas had an average temperature of 2190° F. and resulted in a readily detectable difference of 120° F.

(2) When the coating material was applied to the strip 12 in such a fashion whereby the inner surface of the formed pipe 12' was coated, the non-coated areas of the formed pipe 12' had an average temperature of 2355° F. while the coated area had an average temperature of 2320° F. and resulted in a readily detectable difference of 35° F.

(3) When the coating material was applied to the strip in such a fashion whereby both the inner and outer surfaces of the formed pipe 12' were coated, the non-coated area of the formed pipe 12' had a temperature of 2300° F. while the coated area had a temperature of 1900° F. and resulted in a readily detectable difference of 400° F.

In summary, the above exemplary results teach the effectiveness of the coating for establishing a detectable difference in the temperature level of the coated areas relative to the non-coated areas as aforedescribed and, of course, a greater difference in temperature between the coated and non-coated areas, if the coating is applied so that it is not only on the outer surface of the formed pipe 12' but the inner surface as well. In obtaining the above exemplary temperatures, a suitable pyrometer was employed such as a Thermodot Optical pyrometer.

An advantageous embodiment of the invention has been shown and described. It will be obvious to those skilled

What is claimed is:

1. In the method for identifying and maintaining the identity of selected portions of a strip of metal of a given material during the processing thereof, the steps of applying a coating of material dissimilar to said strip of metal and having the characteristics of heat reflection to selected surface areas of said metal being processed, subjecting the coated and uncoated areas to heat and thereafter detecting the coated and uncoated areas by observing the noticeable difference in the temperature characteristics of the coated and uncoated areas of the metal due to the different temperature levels reached by the coated and uncoated areas.

2. A method as set forth in claim 1 wherein the strip of metal is steel and the coating is aluminum paint.

3. In a method for detecting and discarding objectionable portions of a welded steel pipe during the manufacture thereof from a steel strip, the steps of applying a coating of a material dissimilar to the steel strip and having the characteristics of heat reflection to a predetermined portion of the steel strip prior to the forming and welding of the steel strip into said pipe, subjecting the coated and uncoated portions of the strip to heat and thereafter detecting the coated and uncoated portions of the strip by observing the noticeable difference in the temperature characteristics of the coated and uncoated portions of th strip due to the different temperature levels reached by the coated and uncoated portions during heating.

4. A method as set forth in claim 3 wherein the dissimilar material is aluminum paint.

5. A method as set forth in claim 3 wherein the steel strip is on the order of .105″ in thickness and the coating is aluminum paint with a thickness on the order of from .0005″ to .004″.

References Cited by the Examiner
UNITED STATES PATENTS

| | | | |
|---|---|---|---|
| 2,587,705 | 3/1952 | De Forest | 73—15 |
| 2,920,384 | 1/1960 | Fasoli et al. | 29—407 |
| 3,020,745 | 2/1962 | Sielicki | 73—15 |
| 3,097,423 | 7/1963 | Makowski | 29—407 |
| 3,210,838 | 10/1965 | Nast et al. | 29—407 |

JOHN F. CAMPBELL, *Primary Examiner.*

THOMAS H. EAGER, *Examiner.*